United States Patent [19]

Grandt

[11] Patent Number: 4,703,549

[45] Date of Patent: Nov. 3, 1987

[54] DOUBLE-ACTING PINCH-FREE IMPACT TOOL

[75] Inventor: Kenneth G. Grandt, Wheeling, Ill.

[73] Assignee: Kristie Products Inc., Wheeling, Ill.

[21] Appl. No.: 887,515

[22] Filed: Jul. 21, 1986

[51] Int. Cl.⁴ ............................................ B23P 19/04

[52] U.S. Cl. .................................... 29/426.5; 29/255; 173/91

[58] Field of Search .................. 173/90, 91; 29/426.5, 29/255, 254

[56] References Cited

U.S. PATENT DOCUMENTS

| | | | |
|---|---|---|---|
| 1,521,265 | 12/1924 | Anderson | 173/91 |
| 1,536,553 | 5/1925 | Anderson, Jr. | 29/426.5 |
| 2,641,831 | 6/1953 | Helton | 29/255 |
| 2,779,089 | 1/1957 | Allen | 29/254 |
| 3,120,292 | 2/1964 | Rambat | 173/91 |
| 3,358,352 | 12/1967 | Wilcox | 29/255 |
| 3,739,452 | 6/1973 | Gadberry | 29/254 |
| 4,405,005 | 9/1983 | Zanker | 173/90 |
| 4,483,058 | 11/1984 | Clutter et al. | 29/254 |

*Primary Examiner*—E. R. Kazenske

*Assistant Examiner*—Hien H. Phan

*Attorney, Agent, or Firm*—Mason, Kolehmainen, Rathburn & Wyss

[57] ABSTRACT

A double-acting pinch-free impact tool includes an elongated rod supporting a workpiece engaging implement at an inner end and a slam handle at the outer end. An impact sleeve is secured adjacent the outer end of the rod and includes a pair of longitudinally spaced apart annular impact surfaces. The impact producting slam handle is slidably mounted on the rod over the impact sleeve and includes an outer wall surrounding the sleeve and slidable longitudinally relative to the rod. A handle stop sleeve is secured within the outer wall at an inner end of the handle and includes an inner annular stop face adatpted to impact against the adjacent impact surface of the sleeve on the rod when the handle is moved rapidly outwardly. An outer handle stop is secured within the outer wall of the handle adjacent the outer end and includes an inner end stop adapted to impact against the adjacent impact surface of the sleeve and the rod when the handle is moved rapidly inwardly on the rod.

6 Claims, 8 Drawing Figures

DOUBLE-ACTING PINCH-FREE IMPACT TOOL

BACKGROUND OF THE INVENTION

1. Field of the Invention

This invention relates to impact tools adapted to apply high impact forces necessary for a wide variety of tasks such as wheel and bearing removal, the stripping of concrete forms and the separation of almost any type of components or parts that are tightly fitted together. More particularly, the impact tool of the present invention is adapted to be double-acting in that both pulling or pushing impact forces can be applied and in addition the tool is designed so that all of the impacting surfaces are formed internally of the handle so that the device is virtually pinch-free in operation.

2. Background of the Prior Art

Impact tools for applying high impact forces for various tasks have been around for some time. U.S. patents to Kenworthy et al, U.S. Pat. No. 3,046,482, Landry Jr., U.S. Pat. No. 4,241,795, Calloway, U.S. Pat. No. 4,308,903, Loratto U.S. Pat. No. 4,327,787 and Thor, U.S. Pat. No. 4,470,440 disclose various impact devices used for tasks such as log splitting, rock and concrete breaking and a variety of other tasks including hammering, chiseling, punching, chipping, drilling or driving.

OBJECTS OF THE INVENTION

It is an object of the invention to provide a new and improved impact tool and more particularly and new and improved impact tool which is double-acting and which is pinch-free in operation.

Another object of the present invention is a new and improved impact tool of the character described which is hand operated, easy to use and manipulate and which can be utilized for a wide variety of tasks with a wide variety of implements detachably mounted thereon for these particular tasks.

Moreover, it is an object of the present invention to provide a new and improved impact tool of the character described which is especially well adapted for use in breaking forms away from poured concrete walls with an impact wedging action and also providing for easy removal or withdrawal of the tool from wedged engagement between a concrete wall and the form.

It is another object of the present invention to provide a new and improved slam handle type impact tool which can be produced in a wide variety of sizes for a wide variety of jobs and which is relatively low in cost and has a long, trouble-free, useful life.

BRIEF SUMMARY OF THE INVENTION

The foregoing and other objects and advantages of the present invention are accomplished in a new and improved, double-acting, pinch-free impact tool formed of metal and including an elongated rod for supporting a workpiece engaging implement at an inner end and a slidable slam handle at an outer end. An impact sleeve is secured on the rod adjacent the outer end and includes a pair of longitudinally spaced apart, annular impact surfaces extending radially outwardly of the rod. An impact producing slam handle is slidably mounted on the rod adjacent the outer end and includes an elongated, hollow, tubular outer wall surrounding the impact sleeve and slidable longitudinally thereon. An inner end stop sleeve is secured within the outer wall of the handle adjacent an inner end and includes a radial inner stop surface projecting inwardly of the handle wall toward the rod and adapted to impact against the adjacent surface of the sleeve on the rod when the handle is moved rapidly outwardly on the rod. An outer handle or end stop is secured within the outer wall of the handle adjacent the outer end and includes an inner stop surface extending radially inward of the outer wall to impact against the adjacent impact surface on the sleeve and the end of the rod when the handle is moved rapidly inwardly on the rod to provide an impact force available to the workpiece engaging implement at the inner end of the rod. A variety of different types of implements such as wedges, chisels, wheel pullers and the like may be attached to the rod and the tool is especially well adapted for use in form stripping and removal of concrete forms from poured concrete slabs, posts, walls and the like.

BRIEF DESCRIPTION OF THE DRAWINGS

For a better understanding of the invention, reference should be had to the following detailed description taken in conjunction with the drawings, in which.

DESCRIPTION OF A PREFERRED EMBODIMENT

Figure 1:
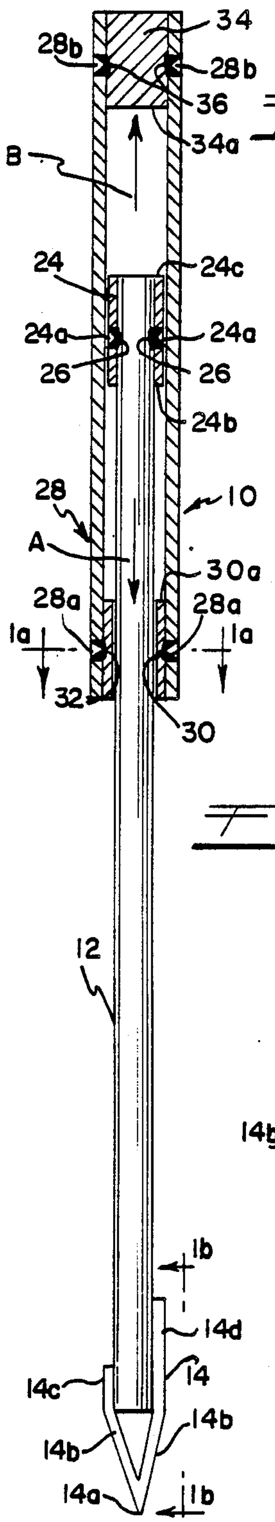
FIG. 1 is a longitudinal elevational view (with a portion in section) of a new and improved impact tool in accordance with the features of the present invention.
Figure 2:
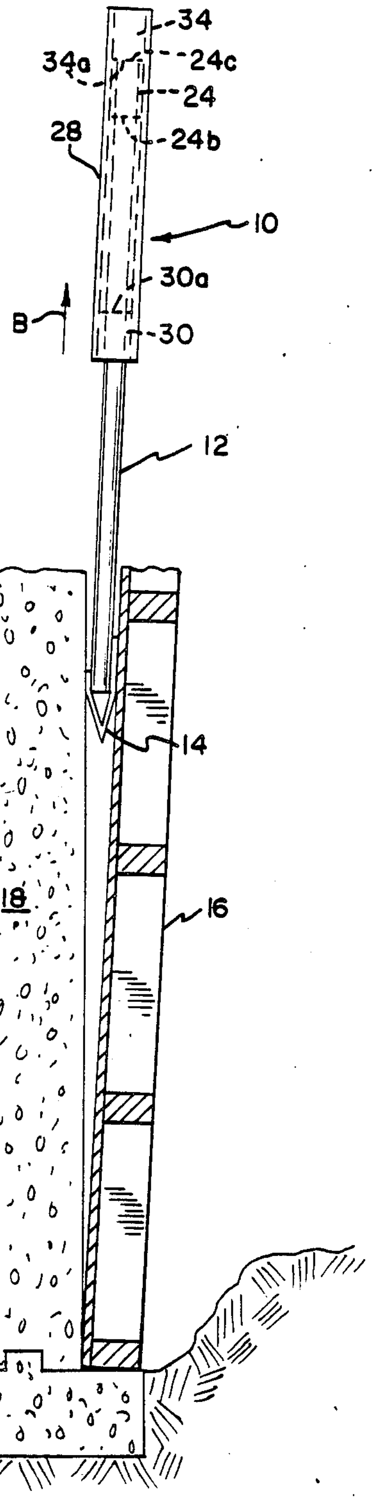
FIG. 2 is a vertical cross-sectional view illustrating the tool in use for aiding in the stripping or removal of form walls from a poured concrete foundation wall.

Referring now more particularly to the drawings and especially FIG. 1, there is illustrated a new and improved slam handle, double-acting, pinch-free impact tool 10 constructed in accordance with the features of the present invention. The tool 10 is especially well adapted for manipulation by hand to perform a wide variety of jobs or tasks wherein high impact forces are required. The tool includes an elongated rod 12 adapted to support an implement such as a wedging element 14 at the end for aiding in the stripping or separation of a form wall 16 from a poured concrete foundation wall 18 as shown in FIG. 2.

Figure 4:
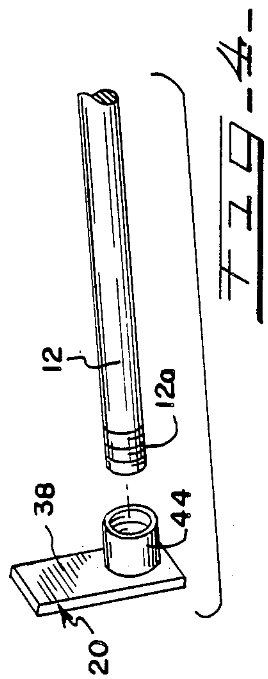
FIG. 4 is a fragmentary perspective view of the implement shown in FIG. 3 in a detached condition.
Figure 6:
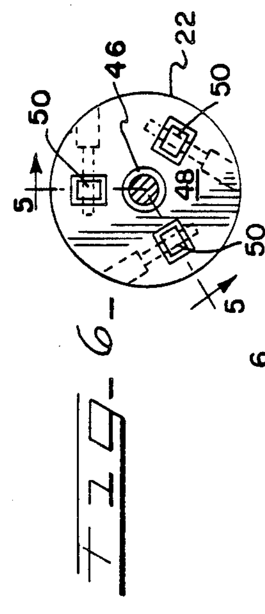
FIG. 6 is a transverse cross-sectional view taken substantially along lines 6—6 of FIG. 5.
Figure 5:
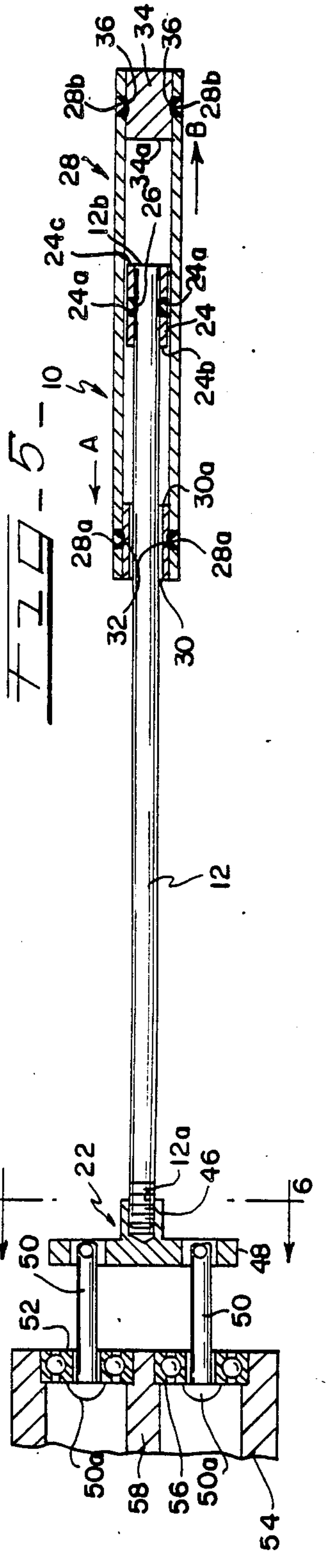
FIG. 5 is an elevational view of the impact tool with portions shown in section and including a wheel or gear puller attached to the impact rod.

The impact tool 10 is also useful for a wide variety of other types of tasks and for this purpose the inner end of the rod 12 is provided with a threaded section **12*a* (FIGS. 3, 4 and 5) for use in attaching a bearing puller implement 20 (FIGS. 3 and 4) or a wheel or gear puller 22 as shown in FIGS. 5 and 6. A wide variety of other types of implements (not shown) may also be attached to the rod 12 by threading the same onto the threaded section 12***a*.

In a preferred embodiment, the rod 12 is formed of cold rolled steel having a length of approximately three feet and an outside diameter of 15/16". For specific applications, the size of the rod and tool can be changed to be smaller or larger as the case may be.

At the outer end of the rod 12, there is provided an impact sleeve 24 fixedly secured thereto and in an embodiment of the present invention, the sleeve is constructed of a piece of thick wall, steel pipe, three inches long having a one inch inside diameter and a one and five eighths inch outside diameter. The impact sleeve is fixedly secured to the rod 12 and for this purpose the body of the sleeve is formed with a plurality of slots or openings 24*a* so that the sleeve and rod may be permanently joined together by welds 26 contained in the openings so that the outer surface of the impact sleeve is smooth. The sleeve 24 provides a pair of longitudinally spaced apart, annular impact surfaces 24*b* and 24*c* at opposite ends which are positioned and enclosed internally within the hollow bore of an elongated, hollow, tubular slam handle 28.

The slam handle is mounted for longitudinal, reciprocal sliding movement on the outer end portion of the rod 12 by hand manipulation as indicated by the respective arrows A and B in FIG. 1, and in a preferred embodiment constructed in accordance with the invention, the slam handle is formed of a piece of cold rolled, thick wall steel tubing $17\frac{1}{2}$" long having a wall thickness of approximately 3/16" and a $2\frac{1}{2}$" outside diameter.

At the inner end of the slam handle 28 there is provided a hollow, tubular, handle stop sleeve 30 constructed of tubular stock similar to that used for the impact sleeve 24. The sleeve 30 is fixedly secured inside the inner end of the outer wall of the slam handle and for this purpose the wall of the handle is provided with a plurality of openings 28*a* adjacent the inner end to accommodate welds 32 for joining the handle stop sleeve to the outer wall of the handle 28. The stop sleeve 30 provides an inner, internal annular stop surface 30*a* adapted to forcefully impact against the facing adjacent impact surface 24*b* of the internal impact sleeve 24 on the rod when the slam handle 28 is moved rapidly outwardly in the direction of the arrow B. This impact force is transmitted through the sleeve 24 to the rod 12 and eventually exerts a pulling or outwardly directed force (arrow B) on a tool or implement 14, 20, 22 or any other type of tool that may be mounted on the inner end portion 12*a* of the rod. Because the mating, impact surfaces 30*a* and 24*b* are defined internally of the outer wall of the slam handle 28, the possibility of pinching the fingers or the hand during an outward slamming stroke of the handle relative to the rod is eliminated.

In accordance with the invention, the slam handle 28 includes an outer handle stop or end plug 34 secured within the tubular wall of the handle adjacent the outer end by means of welds 36 provided in apertures 28*b* formed in the handle wall. The outer end stop of the handle includes a radial inner face 34*a* of circular shape adapted to impact against an outer end surface 12*b* of the rod 12 and the outer annular stop surface 24*a* of the internal impact sleeve 24 when the slam handle is slammed rapidly inwardly on the rod towards the implement or tool 14 in the direction of arrow A. The impact force exerted between the circular surfaces 34*a*, 12*b* and 24*c* directs a sharp impact force in the direction of the arrow A to any tool or other implement mounted on the threaded end segment of 12*a* of the rod.

Figure 1A:
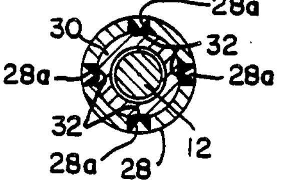
FIG. 1*a* is a transverse cross-sectional view of the impact tool taken substantially along lines 1*a*—1*a* of FIG. 1.
Figure 1B:
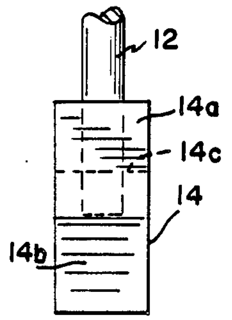
FIG. 1*b* is a fragmentary side elevational view (looking in the direction of arrows 1*b*—1*b*) of the impact tool showing a wedge type implement attached to the end of the impact rod useful for the removal of forms from a poured concrete wall.

The all-welded construction as described provides a heavy duty tool 12 having a long and useful life under high stress conditions and numerous repetitions, and it has been found that cold rolled steel works extremely well and provides an economical material for manufacturing the impact tool. It has been found that the wedge implement 14 illustrated in FIGS. 1, 1*a* and 1*b* is extremely useful in a form stripping operation as illustrated in FIG. 2 wherein the wedge tool 14 is impacted downwardly between a surface of the poured concrete wall 18 and the adjacent facing surface of the form structure 16. Once the impact tool has been used to wedge these surfaces apart or break the form loose, the tool can be withdrawn from wedging engagement by impacting action when the slam handle 28 is moved upwardly in the direction of arrow B so that the inner end stop surface 30*a* strikes the adjacent annular stop surface 24*b* within the internal wall of the handle body.

The wedge implement 14 includes a pointed outer end 14*a* formed by a pair of wedge elements 14*b* tapering outwardly from the pointed end toward a greater spacing equal to the diameter of the rod and these end elements are in turn joined with a pair of parallel side segments 14*c* and 14*d* secured on opposite sides of the rod 12 and joined to the elements 14*b* by welding.

Figure 3:
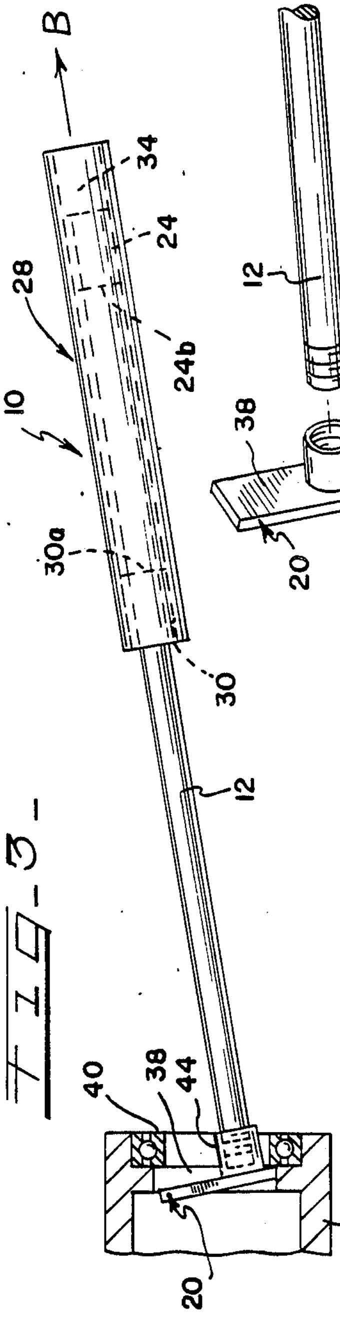
FIG. 3 is a longitudinal elevational view of the impact tool having a bearing puller implement attached to the inner end of the impact rod.

Referring to FIG. 3, the bearing puller 20 includes a blade element or flat bar 38 of appropriate size adapted to be inserted through the hollow bore of a bearing ring 40 and thereafter the edges of the inner race of the bearing are engaged by opposite ends of the flat bar 38 so that impact forces applied by moving the slam handle 28 rapidly outwardly in the direction of the arrow B, FIG. 3, will break the bearing assembly 40 loose from frozen or tightly seated engagement within an axial housing 42 or the like. The puller includes a socket segment 44 internally threaded to receive the threaded section 12*a* of the implement rod 12 as illustrated best in FIG. 4. A variety of different sized pullers 20 of the same or different type may be detachably mounted on the rod of the impact tool as desired.

In another application, a wheel or gear puller 22 may be attached to the threaded end section 12*a* of the impact rod by means of an internally threaded socket 46 formed on a circular plate 48. The plate 48 provides support for the inner ends of a plurality of equilaterally spaced apart, pivotable hook fingers 50, each having a hooked end segment 50*a* at the outer end adapted to engage either the inner race of an outer bearing assembly 52 mounted in an axle sleeve 54 or alternatively, engage the outer race of a bearing assembly 56 mounted on a spindle 58 as the case may be.

From the foregoing it will be seen that the impact tool provides a pinch-free, double-acting, slam handle type, high impact force, impacting device for accommodating a wide variety of jobs. The tool is easily handled and is economic to construct and easy to use. The tool 10 is an extremely handy device available for a wide variety of purposes and tasks.

Although the present invention has been described with reference to a single illustrated embodiment thereof, it should be understood that numerous other modifications and embodiments can be made by those skilled in the art that will fall within the spirit and scope of the principles of this invention.

What is claimed as new and is desired to be secured by Letters Patent is:

1. In combination, a doubleacting, pinch-free, impact tool, and a workpiece engaging implement comprising:

an elongated rod for supporting said workpiece engaging implement at an inner end and a reciprocating slam handle at an outer end;

an impact sleeve secured on said rod adjacent said outer end and including a pair of longitudinally spaced apart, annular impact surfaces extending radially outwardly of said rod;

an impact producing slam handle slidably mounted on said rod adjacent said outer end and including an elongated, hollow tubular outer wall surrounding said impact sleeve and reciprocally slidable longitudinally relative thereof;

a handle stop sleeve secured within said outer wall adjacent an inner end of said slam handle and including an inner, annular stop surface projecting radially inwardly of said outer wall toward said rod and adapted to impact against the adjacent annular impact surface of said impact sleeve when said slam handle is moved longitudinally outward on said rod;

an outer, handle stop secured within said outer wall adjacent an outer end of said slam handle and including an inner end stop surface extending radially inwardly of said outer wall adapted to impact against the adjacent annular impact surface of said impact sleeve when said slam handle is moved longitudinally inward on said rod; and said implement including a base with socket means for receiving said inner end of said rod for detachably coupling said implement on said rod, said implement further including a plurality of fingers mounted to said base and extending outwardly from said base from each finger being freely pivotable about a pivot axis extending perpendicular to and radially offset from a longitudinal axis of said rod the axis of each finger intersecting the axes of adjacent fingers at equal angles and said fingers having hooked end portions remote from said base for engaging a workpiece to be subjected to impact forces from said tool.

2. The impact tool of claim 1, wherein:

said impact sleeve comprises a hollow tubular wall member having at least one weld opening in the wall thereof for welding said impact sleeve onto said rod for securing said sleeve in place.

3. The impact tool of claim 1, wherein:

said outer wall of said handle is formed with at least one weld opening therein adjacent said inner end; and said stop sleeve comprises a hollow tubular wall member sidable on said rod, secured to said wall of said handle by welding in said weld opening thereof.

4. The impact tool of claim 3, wherein:

said outer of said handle includes at least a second weld opening therein adjacent said outer end; and said outer handle stop is secured to said handle wall by welding in said second weld opening thereof.

5. The impact tool of claim 1 wherein said fingers are spaced equilaterally across an axis of said socket means aligned with said rod.

6. The impact tool of claim 5 wherein said fingers are pivotably attached to said socket means for movement of said hooked end portions toward and away from said socket axis.

* * * * *